D. C. McROBERTS.
APPARATUS FOR MAKING INNER TUBES AND THE LIKE.
APPLICATION FILED NOV. 23, 1921.
1,433,561. Patented Oct. 31, 1922.
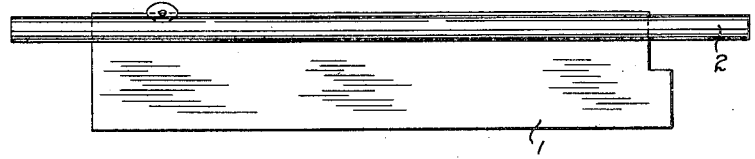
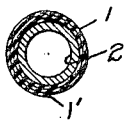
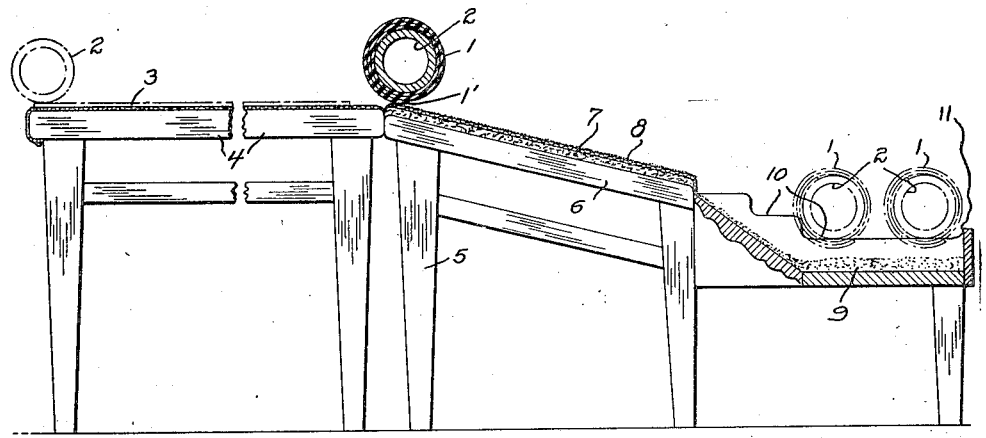
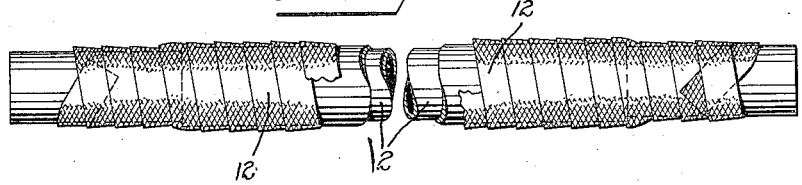
Inventor
Donal C. McRoberts
By his Attorney
Ernest Hopkinson Patented Oct. 31, 1922.

1,433,561

UNITED STATES PATENT OFFICE.

DONAL C. McROBERTS, OF INDIANAPOLIS, INDIANA, ASSIGNOR TO G & J TIRE COMPANY, A CORPORATION OF INDIANA.

APPARATUS FOR MAKING INNER TUBES AND THE LIKE.

Original application filed June 8, 1921, Serial No. 475,854. Now Patent No. 1,406,669. Divided and this application filed November 23, 1921. Serial No. 517,220.

*To all whom it may concern:*

Be it known that I, DONAL C. McROBERTS, a citizen of the United States, residing at Indianapolis, county of Marion, and State of Indiana, have invented certain new and useful Improvements in an Apparatus for Making Inner Tubes and the like, of which the following is a full, clear and exact description.

This invention relates to an apparatus for facilitating the manufacture of hollow plastic articles, and more particularly tubular articles of vulcanizable rubber composition, such as inner tubes for making pneumatic tires, this application being a division of my prior application Serial No. 475,854, filed June 8th, 1921.

In my prior application is disclosed a method of eliminating expensive fabric jackets by coating the formed inner tube or article with a lubricating substance, such as mica. The present invention relates to an apparatus for facilitating the application or coating of the tube or article with a lubricating substance, such as mica, and removing any excess of the same, the application and removal of the excess lubricating substance being effected automatically and immediately after the tube has been formed from a sheet of vulcanizable rubber composition. The invention aims to economize in labor and material, and endeavors to eliminate the production of defective or "second" tubes incident to these particular steps in their manufacture.

A preferred form of the invention is illustrated in the accompanying drawings in which:—

Fig. 1 is a plan view of a sheet of stock, showing the pole about to be rolled thereover, Fig. 2 is a section showing the green tube after it has been plied up by rolling, Fig. 3 is an elevation partly in section of a preferred form of mica-applying table, and Fig. 4 illustrates the manner of spirally wrapping the green tube with a tape after its exterior has been coated with mica.

In the manufacture of inner tubes as a type of hollow rubber articles, a sheet 1 of vulcanizable rubber composition is usually coiled two or more times around a pole 2, in order to obtain the tubular form. See Figs. 1 and 2. This may be accomplished in any suitable manner, preferably, as shown in Fig. 3, by rolling upon the horizontal surface 3 of a table 4, operatives at opposite ends of the table giving the pole a spin with their hands bringing it from the position shown at the left of Fig. 3 to approximately that shown at the right of the table. Adjacent the table 4, I preferably provide a coating table, indicated generally at 5, having a downwardly inclined top 6, on whose surface is laid a layer of felt 7, which is covered with a sheet 8 of any suitable imperforate and smooth material, such as rubber. After plying up the sheet 1 of green stock, the formed tube on the pole 2 is rolled or gravitated down the table 5, whose surface 8 has been dusted with a lubricant, such as mica. In this operation, the lengthwise shoulder or seam 1' of the hollow article is disposed in the relation shown in suchwise that the lubricant is prevented from collecting therein. At the lower side of the inclined table 6 is arranged a trough 9, which is flanked by notched or shouldered side pieces 10. These latter are arranged at such a distance apart as to receive the bare or uncoated ends of the poles, and the notches or shoulders afford successive drops down which the poles bump and thus shake off any excess lubricant, the excess, of course, collecting in the trough 9 for redistribution as required over the surface of the coating-table 5. A stop 11 is preferably provided at the side of the trough 9 to halt movement of the poles, the length of the trough in the direction of the movement of the poles being as long as desired to accommodate the rate of production.

Subsequently, the formed and coated tube is wrapped in spiral convolutions of fabric 12, as illustrated in Fig. 4. Thus, it is made ready for vulcanization which is then carried on in any suitable manner, with either the wrapper 12 in place, or with the ends of the tube only taped down.

The invention is not limited to the practice of the method disclosed in my prior application, and any use following the underlying principles mentioned above is contemplated. Reference should therefore be made to the accompanying claims for an understanding of its scope.

Having thus described my invention, what I claim and desire to protect by Letters Patent is:

1. An apparatus for applying a lubricating substance to vulcanizable rubber tubes formed about mandrels, comprising an inclined table upon which lubricating substances may be scattered, and means at the lower end of said inclined table for shaking the mandrel.

2. An apparatus for applying a lubricating substance to vulcanizable rubber tubes formed about mandrels, comprising an inclined table upon which a lubricating substance may be scattered, and stepped down side pieces adjacent the lower edge of said inclined surface spaced apart a distance less than the length of the pole but greater than the length of the vulcanizable rubber tube formed thereabout.

3. An apparatus for applying a lubricating substance to vulcanizable rubber tubes formed about mandrels, comprising an inclined table upon which a lubricating substance may be scattered, and stepped down side pieces adjacent the lower edge of said inclined surface spaced apart a distance less than the length of the pole but greater than the length of the vulcanizable rubber tube formed thereabout, and a trough for catching the lubricating substance intermediate said side pieces as it is shaken off.

Signed at Indianapolis this 17th day of November, 1921.

DONAL C. McROBERTS.